(12) United States Patent
Kim et al.

(10) Patent No.: US 11,435,758 B2
(45) Date of Patent: Sep. 6, 2022

(54) ELECTRONIC CONTROL SYSTEM

(71) Applicant: LG Electronics Inc., Seoul (KR)

(72) Inventors: Jinkyoung Kim, Seoul (KR);
Namyong Park, Seoul (KR); Namsu Lee, Seoul (KR); Sangwoo Han, Seoul (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 16/551,207

(22) Filed: Aug. 26, 2019

(65) Prior Publication Data

US 2019/0377361 A1 Dec. 12, 2019

(30) Foreign Application Priority Data

Aug. 1, 2019 (KR) .................. 10-2019-0093818

(51) Int. Cl.
| | |
|---|---|
| *G05D 1/02* | (2020.01) |
| *G01C 21/36* | (2006.01) |
| *G06F 16/25* | (2019.01) |
| *G05D 1/00* | (2006.01) |
| *G06F 16/182* | (2019.01) |

(52) U.S. Cl.
CPC ....... *G05D 1/0276* (2013.01); *G01C 21/3697* (2013.01); *G05D 1/0027* (2013.01); *G05D 1/0212* (2013.01); *G06F 16/183* (2019.01); *G06F 16/252* (2019.01)

(58) Field of Classification Search
CPC .. G05D 1/0276; G05D 1/0027; G05D 1/0212; G06F 16/183; G06F 16/252; G01C 21/3697

USPC ........................................................ 701/36
See application file for complete search history.

(56) References Cited

U.S. PATENT DOCUMENTS

| | | | | |
|---|---|---|---|---|
| 8,713,287 | B2 * | 4/2014 | Bell, Jr. ................ | G06F 9/5088 712/28 |
| 9,883,209 | B2 | 1/2018 | Ricci | |
| 10,250,434 | B2 * | 4/2019 | Oda ........................ | H04L 67/34 |
| 2013/0107853 | A1 * | 5/2013 | Pettus ................... | H04W 84/10 370/330 |
| 2014/0309880 | A1 * | 10/2014 | Ricci ..................... | G06F 3/0622 701/36 |

(Continued)

FOREIGN PATENT DOCUMENTS

| | | | | | |
|---|---|---|---|---|---|
| CN | 107925507 | A | * | 4/2018 | .......... G06F 11/1004 |
| CN | 110001573 | A | * | 7/2019 | ............. E05B 81/76 |

(Continued)

OTHER PUBLICATIONS

S.W. Olson, "BGA Backplane Connector for High Speed Differential Signals," 2001, Publisher: IEEE.*

(Continued)

*Primary Examiner* — Tuan C To
(74) *Attorney, Agent, or Firm* — Fish & Richardson P.C.

(57) ABSTRACT

There is provided an electronic control system including: a plurality of blade processors and a plurality of backplanes. One or more of a vehicle, electronic control system, and autonomous driving vehicle, disclosed in the present invention, are able to realize connection with an Artificial Intelligence (AI) module, a Unmanned Aerial Vehicle (UAV), a robot, an Augmented Reality (AR) device, a Virtual Reality (VR) device, a 5G service device, and the like.

15 Claims, 7 Drawing Sheets

(56) References Cited

U.S. PATENT DOCUMENTS

| | | | | |
|---|---|---|---|---|
| 2015/0025733 A1* | 1/2015 | Choi | ........................ | H04W 4/48 |
| | | | | 701/29.1 |
| 2015/0254909 A1* | 9/2015 | Harata | .................. | G07C 5/0816 |
| | | | | 701/31.5 |
| 2016/0086391 A1* | 3/2016 | Ricci | ....................... | G06Q 10/10 |
| | | | | 701/29.3 |
| 2016/0373557 A1* | 12/2016 | Sikkink | ................... | H04L 1/007 |
| 2017/0187567 A1* | 6/2017 | Oda | ..................... | G07C 5/0808 |
| 2019/0296937 A1* | 9/2019 | Kern | ................. | H04L 12/40039 |
| 2020/0097414 A1* | 3/2020 | Li | ......................... | G06F 15/167 |

FOREIGN PATENT DOCUMENTS

| | | | | | |
|---|---|---|---|---|---|
| DE | 102017121026 A1 * | 4/2018 | ....... | H04L 12/40013 |
| DE | 102018220296 A1 * | 5/2019 | ............. | B62D 12/02 |
| WO | WO-2013019736 A1 * | 2/2013 | ........... | H04B 5/0031 |
| WO | WO-2019123747 A1 * | 6/2019 | ............. | G06F 8/654 |

OTHER PUBLICATIONS

Radek Soukup, "Defect Level Prediction for Newly Designed Printed Circuit Board Assemblies," 2009, Publisher: IEEE.*
C. Schuster et al., "Issues and Challenges of Gbps Backplane Connector Characterization," 2004, Publisher: IEEE.*

* cited by examiner

ELECTRONIC CONTROL SYSTEM

CROSS-REFERENCE TO RELATED APPLICATION

This application is based on and claims priority under 35 U.S.C. § 119(a) to Korean Patent Application No. 10-2019-0093818, filed on Aug. 1, 2019, the disclosure of which is incorporated herein in its entirety by reference.

BACKGROUND

1. Field

The present disclosure relates to an electronic control system. More particularly, this disclosure relates to an electronic control system including a plurality of blade processors and a plurality of backplanes.

2. Description of the Related Art

With the intelligence of automobiles, there is a growing interest in an electronic control system, and it is necessary to more effectively provide this electronic control system.

In addition, an autonomous driving vehicle refers to a vehicle on which an autonomous driving apparatus capable of recognizing an environment around the vehicle and a condition of the vehicle, and thus controlling the driving of the vehicle is mounted. As researches on the autonomous driving vehicle are carried out, researches on various services that may increase the convenience of a user by using the autonomous driving vehicle are being carried out together.

SUMMARY

The disclosed embodiments are intended to disclose an electronic control system. Technical problems to be dealt with by the present embodiment are not limited to the aforementioned technical problems, and other technical problems may be inferred from the following embodiments.

According to an embodiment of the present invention, there is provided an electronic control system for a vehicle, including: a plurality of blade processors configured to implement different functions in a vehicle; and a plurality of backplanes that house the plurality of blade processors for electrical connection between the plurality of blade processors, in which a first backplane among the plurality of backplanes may separately house at least one blade processor configured to implement a wireless communication function, among the plurality of blade processors.

According to another embodiment, there is provided a backplane assembly for housing a plurality of blade processors, including: a first backplane that separately houses at least one blade processor configured to implement a wireless communication function, among a plurality of blade processors; and a second backplane that houses a blade processor other than the at least one blade processor among the plurality of blade processors.

According to still another embodiment, there is provided a vehicle including: electronic devices; and an electronic control system configured to perform control of the electronic devices, in which the electronic control system includes a plurality of blade processors configured to implement different functions through the electronic devices; and a plurality of backplanes that house a plurality of blade processors for electrical connection between the plurality of blade processors, and in which a first backplane among the plurality of backplanes may separately house at least one blade processor configured to implement a wireless communication function, among the plurality of blade processors. The specific matters of other embodiments are included in the detailed description and drawings.

According to the present disclosure, in a system with a plurality of backplanes, the electronic control system may more easily manage noise due to a wireless communication function through a backplane that separately houses a blade processor configured to implement the wireless communication function, so that it is possible to increase stability. Specifically, since noise may be generated in the process of implementing a wireless communication function by the blade processor, and the generated noise may result a malfunction in another blade processor, it is possible to prevent the malfunction of the other blade processor through a backplane that separately houses the blade processor configured to implement the wireless communication function.

The effects of the invention are not limited to the aforementioned effects, and other effects that have not been mentioned may be apparently understood by those skilled in the art from the description of the claims.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
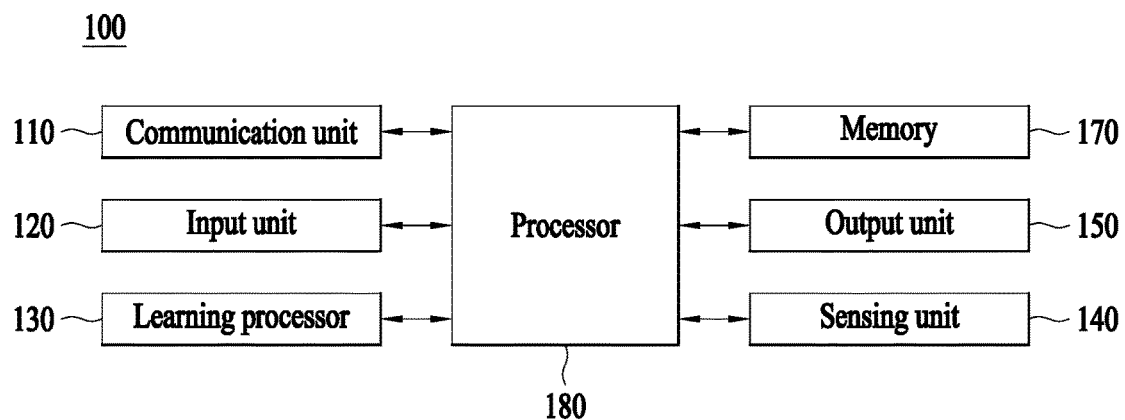
FIG. 1 illustrates an AI device according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described in detail with reference to the drawings.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, Terminal 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
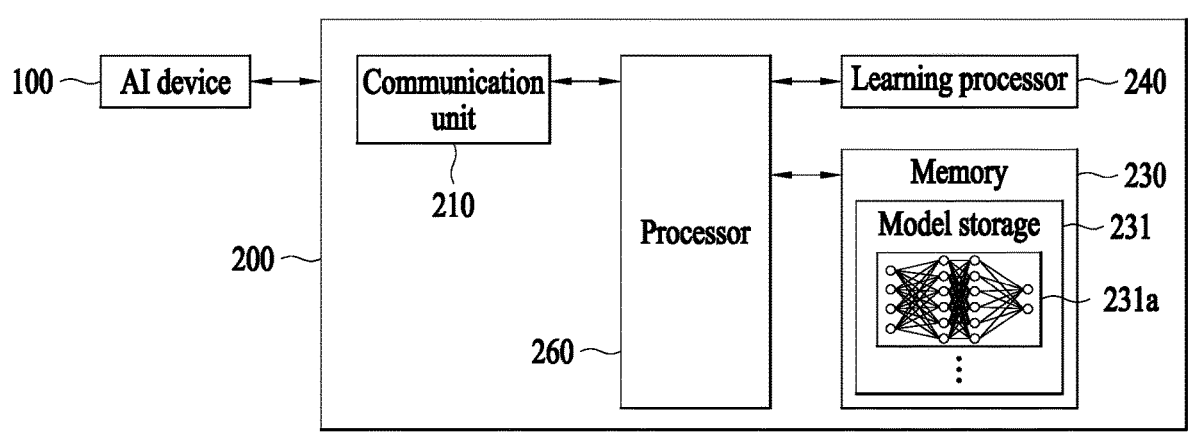
FIG. 2 illustrates an AI server according to an embodiment.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
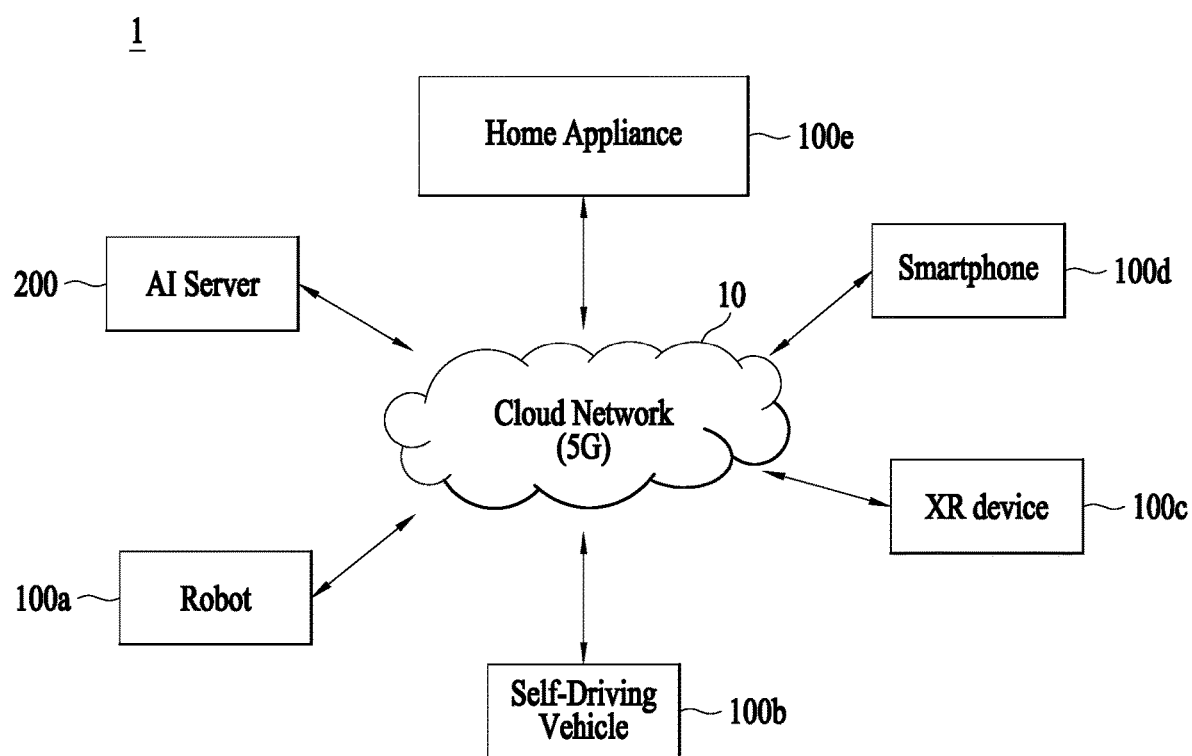
FIG. 3 illustrates an AI system according to an embodiment.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a lidar, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

At this time, autonomous driving vehicle 100b may generate a result using the learning model to perform an operation, but may transmit sensor information to an external device such as AI server 200 and receive a result generated by the external device to perform an operation.

Autonomous driving vehicle 100b may determine a movement route and a driving plan using at least one of map data, object information detected from sensor information, and object information acquired from an external device, and a drive unit may be controlled to drive autonomous driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100b may perform an operation or may drive by controlling the drive unit based on user control or interaction. At this time, autonomous driving vehicle 100b may acquire interactional intention information depending on a user operation or voice expression, and may determine a response based on the acquired intention information to perform an operation.

Figure 4:
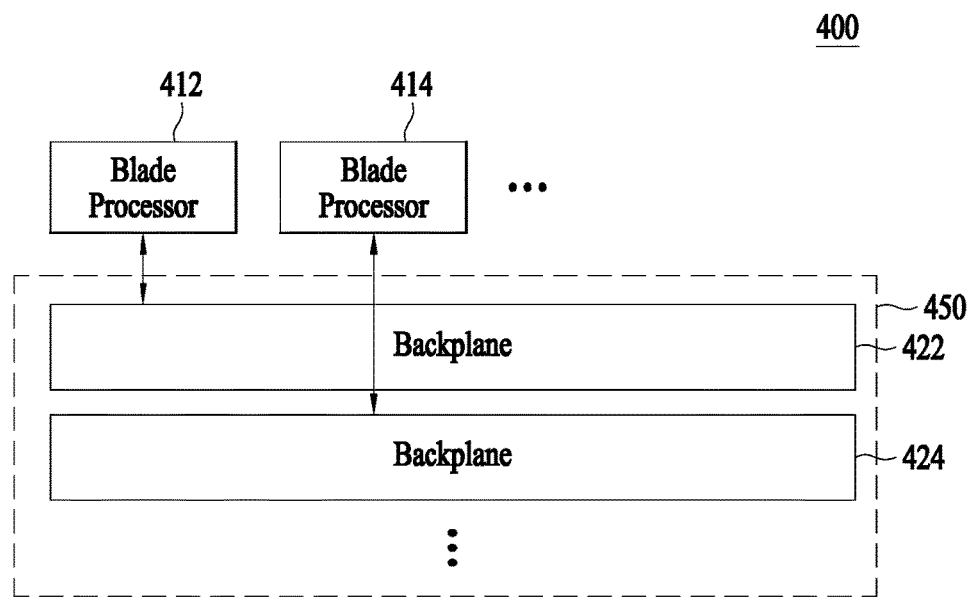
FIG. 4 illustrates an electronic control system according to the present disclosure.

FIG. 4 illustrates an electronic control system according to the present disclosure.

An electronic control system 400 may be included in the vehicle and may be a system for controlling the vehicle. For example, the vehicle may be an autonomous driving vehicle.

The electronic control system 400 may include a plurality of blade processors 412 and 414, and a backplane assembly 450 for housing the plurality of blade processors 412 and 414. The backplane assembly 450 may include a plurality of backplanes 422 and 424. The electronic control system 400 illustrated in FIG. 4 illustrates only components related to the present embodiment. Therefore, it will be understood by those skilled in the related art according to the present embodiment that other general-purpose components other than the components illustrated in FIG. 4 may be further included. In addition, even though two blade processors and two backplanes are illustrated in FIG. 4, the electronic control system 400 may include three or more blade processors and three or more backplanes.

The plurality of blade processors 412 and 414 may implement different functions in the vehicle. Specifically, each of the plurality of blade processors 412 and 414 may include a microprocessor, memory, and interface, and may implement different functions in the vehicle. In addition, each of the plurality of blade processors 412 and 414 may include a system-on-chip (SoC). For example, a first blade of the plurality of blade processors 412 and 414 may implement a function of receiving broadcast from an external base station, and a second blade of the plurality of blade processors 412 and 414 may implement an Advanced Driver Assistance System (ADAS).

The plurality of blade processors 412 and 414 may be designed to be attachable to or detachable from the backplane assembly 450. When the blade processor is mounted on the backplane assembly 450, electrical connection may be made between the blade processor and the backplane.

A plurality of backplanes 422 and 424 may house a plurality of blade processors 412 and 414 for electrical connection between the plurality of blade processors 412 and 414. Specifically, a first backplane 422 among the plurality of backplanes 422 and 424 houses at least one blade processor 412, so that electrical connection may be made between the first backplane 422 and the at least one blade processor 412, and a second backplane 424 houses a blade processor 414, so that electrical connection may be made between the second backplane 424 and the blade processor 414. In addition, the plurality of backplanes 422 and 424 may be connected to each other, so that electrical connection may be made between the at least one blade processor 412 and the blade processor 414. According to an embodiment, the backplane may be configured as an electrical connector and may include a printed circuit board (PCB).

The at least one blade processor 412 may be a blade processor configured to implement the wireless communication function. The at least one blade processor 412 may be a blade processor of processing a Radio Frequency (RF) signal. For example, the at least one blade processor 412 may include at least one of a blade processor configured to receive broadcast or radio signals, a blade processor having an RF module, a blade processor having a 5G communication module, a blade processor configured to implement a Vehicle to Everything (V2X) communication function, and a blade processor configured to implement a Dedicated Short Range Communication (DSRC) communication function. The at least one blade processor 412 may generate noise according to the RF signal, and generate an Electro Magnetic Interference (EMI).

The at least one blade processor 412 may be a blade processor of processing a signal according to a CAN (Controller Area Network) communication. In addition, the at least one blade processor 412 may generate noise in the process of processing a signal according to the CAN communication.

Among the plurality of blade processors 412 and 414, the blade processor 414 other than the at least one blade processor 412 may be a blade processor configured to implement a function other than the wireless communication function. For example, the blade processor 414 may include at least one of a blade processor configured to perform digital signal processing, a blade processor configured to perform high performance computer vision processing, a blade processor configured to implement the Advanced Driver Assistance System (ADAS), a blade processor including an SoC for image recognition for a vehicle application, and a blade processor configured to implement various infotainment systems.

The first backplane 422 among the plurality of backplanes 422 and 424 may separately house at least one blade processor 412 configured to implement the wireless communication function, among the plurality of blade processors 412 and 414. Specifically, the first backplane 422 among the plurality of backplanes 422 and 424 is capable of exclusively housing at least one blade processor 412 configured to implement the wireless communication function, among the plurality of blade processors 412 and 414, and a second backplane 424 among the plurality of backplanes 422 and 424 may house the blade processor 414 configured to implement a function other than the wireless communication among the plurality of blade processors 412 and 414. For example, the second backplane 424 among the plurality of backplanes 422 and 424 may house the blade processor 414 configured to implement a digital signal processing function, and a third backplane (not illustrated) among the plurality of backplanes 422 and 424 may house a blade processor (not illustrated) configured to implement the Advanced Driver Assistance System (ADAS).

Therefore, in the system with a plurality of backplanes, the electronic control system 400 may more easily manage noise due to the wireless communication function through the backplane that separately houses the blade processor configured to implement the wireless communication function, so that it is possible to increase stability. Specifically, since noise may be generated in the process of implementing a wireless communication function by the blade processor, and the generated noise may result a malfunction in another blade processor, it is possible to prevent the malfunction of the other blade processor through a backplane that separately houses the blade processor configured to implement the wireless communication function.

For example, in a case where the electronic control system 400 includes a first backplane that houses a first blade processor configured to implement the wireless communication function, and a second backplane that houses a second blade processor configured to implement a function other than the wireless communication function, the first backplane may remove noise generated by the first blade processor through a filter and transmit, through the second backplane to the second blade processor, data of the noise-removed first blade processor. Therefore, the second blade processor is capable of processing data of the first blade processor without any noise that is generable by the first blade processor.

Figure 5:
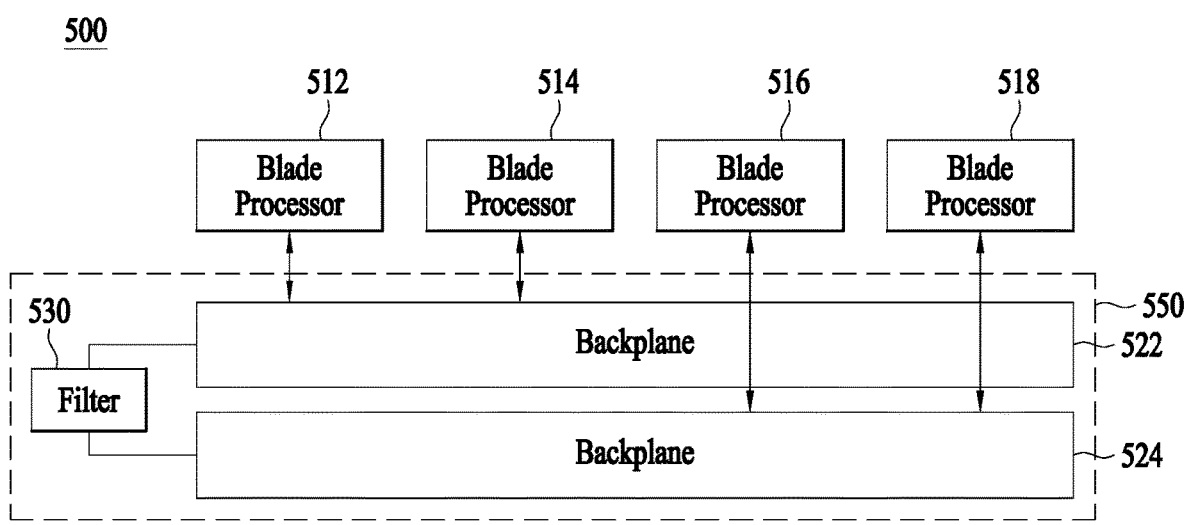
FIG. 5 illustrates a first embodiment of the electronic control system.

FIG. 5 illustrates a first embodiment of the electronic control system.

An electronic control system 500 may include a first to fourth blade processors 512, 514, 516, and 518, and a backplane assembly 550. The backplane assembly 550 may include a first and second backplanes 522 and 524, and a filter 530. The first to fourth blade processors 512, 514, 516, and 518, and the backplane assembly 550 may correspond to the plurality of blade processors 412 and 414, and the backplane assembly 450 in FIG. 4, and descriptions thereof will not be repeated.

Each of the first and second blade processors 512 and 514 may be a blade processor configured to implement the wireless communication function. For example, the first blade processor 512 may include a modem for telematics communication, and the second blade processor 514 may include a radio module.

A first backplane 522 may separately house a first to second blade processors 512 and 514 configured to implement the wireless communication function. A second backplane 524 may house a third to fourth blade processors 516 and 518 configured to implement functions other than the wireless communication function. For example, the third blade processor 516 may be a blade processor configured to implement a Head Up Display function, and the fourth blade processor 518 may be a blade processor configured to sense a gesture of a vehicle processor.

The first backplane 522 and the second backplane 524 may be connected through a filter 530. For example, the filter 530 may be a high pass filter for removing RF noise. The first backplane 522 and the second backplane 524 may be electrically connected to each other and data of the first blade processor 512 or data of the second blade processor 514 may be transferred to the third blade processor 516 and the fourth blade processor 518 through the first backplane 522 and the second backplane 524. At this time, since there is provided the filter 530 between the first backplane 522 and the second backplane 524, the filter 530 may remove RF noise generated by the first blade processor 512 and the second blade processor 524, and the resulting RF noise may not affect the third blade processor 516 and the fourth blade processor 518. Therefore, the third blade processor 516 or the fourth blade processor 518 may not be affected by the noise generated by the first blade processor 512 or the second blade processor 514, and may process the data of the first blade processor 512 or the data of the second blade processor 514.

Figure 6:
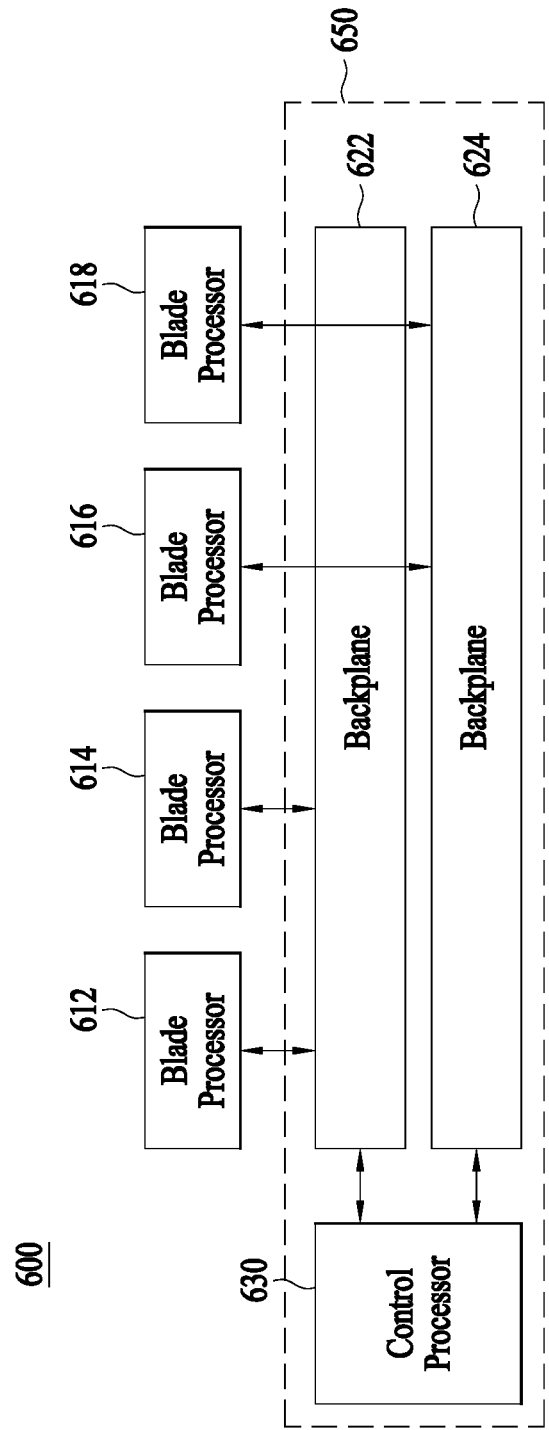
FIG. 6 illustrates a second embodiment of the electronic control system.

FIG. 6 illustrates a second embodiment of the electronic control system.

An electronic control system 600 may include a first to fourth blade processors 612, 614, 616, and 618, and a backplane assembly 650. The backplane assembly 650 may include a first and second backplanes 622 and 624, and a control processor 630. The first to fourth blade processors 612, 614, 616, and 618, and the backplane assembly 650 may correspond to the plurality of blade processors 412 and 414, and the backplane assembly 450 in FIG. 4, and descriptions thereof will not be repeated.

Each of the first blade processor 612 and the second blade processor 614 may be a blade processor configured to implement a wireless communication function. For example, the first blade processor 612 may include a modem for V2X communication, and the second blade processor 614 may include a DMB module.

A first backplane 622 may separately house a first blade processor 612 and a second blade processor 614 configured to implement a wireless communication function. The second backplane 624 may house a third to fourth blade processors 616 and 618 configured to implement functions other than the wireless communication function. For example, the third blade processor 616 may be a blade processor configured to implement a Center Information Display (CID) function, and the fourth blade processor 618 may be a blade processor for display of a rear seat in the vehicle.

The control processor 630 may be a processor configured to implement necessary functions of the vehicle. The control processor 630 may include a microprocessor, memory, and an interface. For example, the control processor 630 may be a processor configured to implement a cluster function of the vehicle. In addition, the control processor 630 may be a processor configured to implement a safety-related function of the vehicle. The control processor 630 may acquire CAN data and may provide the acquired CAN data to at least one of the first to fourth blade processors 612, 614, 616, and 618. The control processor 630 may be embedded in the backplane assembly 650.

The control processor 630 may receive, from the first backplane 622, data processed by the first blade processor 612 or the second blade processor 614, and may transmit the received data to the third blade processor 616 or to the fourth blade processor 618, through the second backplane 624. Therefore, the third blade processor 616 or the fourth blade processor 618 may not be affected by the noise generated by the first blade processor 612 or the second blade processor 614, and may process the data of the first blade processor 612 or the data of the second blade processor 614.

In addition, the control processor 630 may receive, from the second backplane 624, data processed by the third blade processor 616 or the fourth blade processor 618, and may transmit the received data to the first blade processor 612 or to the second blade processor 614, through the first backplane 622.

Figure 7:
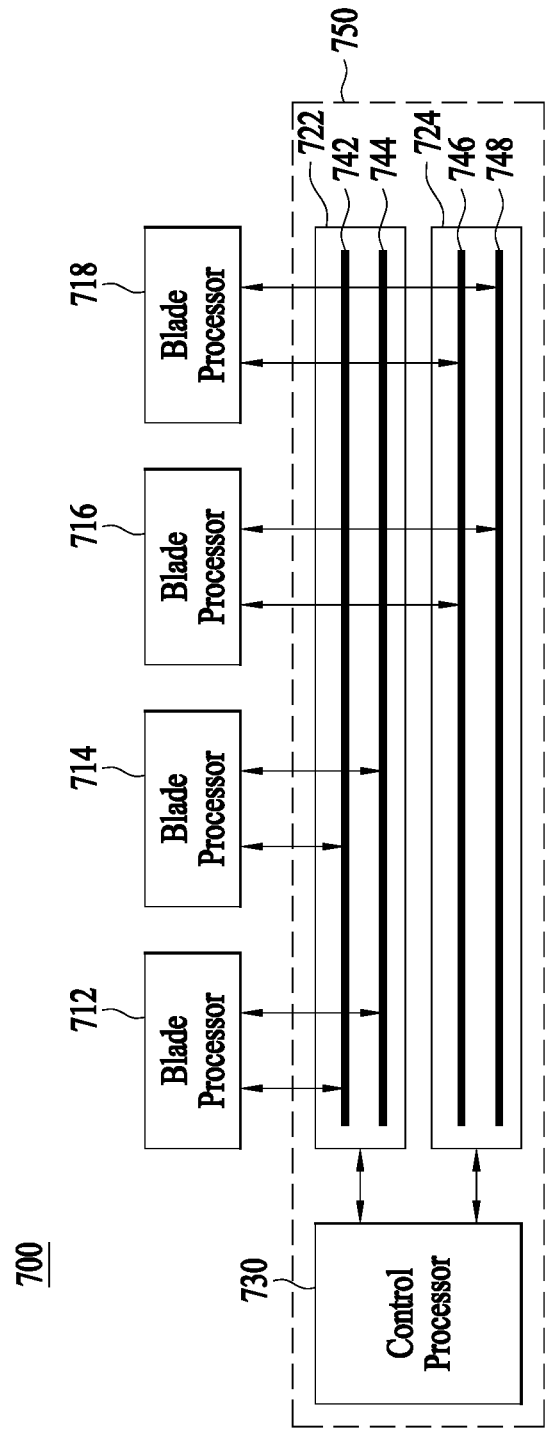
FIG. 7 illustrates a third embodiment of the electronic control system.

FIG. 7 illustrates a third embodiment of the electronic control system.

An electronic control system 700 may include a first to fourth blade processors 712, 714, 716, and 718 and a backplane assembly 750. The backplane assembly 750 may include a first and second backplanes 722 and 724, and a control processor 730. The first to fourth blade processors 712, 714, 716, and 718, and the backplane assembly 750 may correspond to the first to fourth blade processors 612, 614, 616, and 618, and the backplane assembly 650 in FIG. 6, and descriptions thereof will not be repeated.

A plurality of communication networks are established on each of the first and second backplanes 722 and 724. Specifically, a first and second communication networks 742 and 744 may be established on the first backplane 722, and a first and second communication networks 746 and 748 may be established on the second backplane 724. The communication networks may be any one of PCIe, USB3.2 and Ethernet, but is not limited thereto. The communication networks may be other well-known communication networks. For example, the first communication network 742 of the first backplane 722 may be PCIe, the second communication network 744 of the first backplane 722 may be USB3.2, the first communication network 746 of the second backplane 724 may be USB3.2, and the second communication network 748 of the second backplane 724 may be PCIe.

The first to fourth blade processors 712, 714, 716, and 718 may transmit or receive data, through a plurality of communication networks established on the first backplane 722 or the second backplane 724. Specifically, each of the first blade processor 712 and the second blade processor 714 may be connected through each of the first communication network 742 and the second communication network 744 established on the first backplane 722, and each of the third blade processor 716 and the fourth blade processor 718 may be connected through each of the first communication network 746 and the second communication network 748 established on the second backplane 724.

Based on at least one of a state of communication networks and a state of data, the control processor 730 may recognize a communication network to transmit or receive data, among a plurality of communication networks. According to one example, in a case where the first communication network 742 of the first backplane 722 and the first communication network 746 of the second backplane 724 are expected to be overloaded, the control processor 730 may perform control of transmitting or receiving data between the first blade processor 712 and the third blade processor 716, through the second communication network 744 of the first backplane 722 and the second communication network 748 of the second backplane 724. According to another example, in a case where the amount of data to be transmitted from the first blade processor 712 to the third blade processor 714 is large, the control processor 730 may perform control of transmitting or receiving data between the first blade processor 712 and the third blade processor 716, through the first communication network 742 of the first backplane 722 and the second communication network 748 of the second backplane 724, with high data transmission speed.

Figure 8:
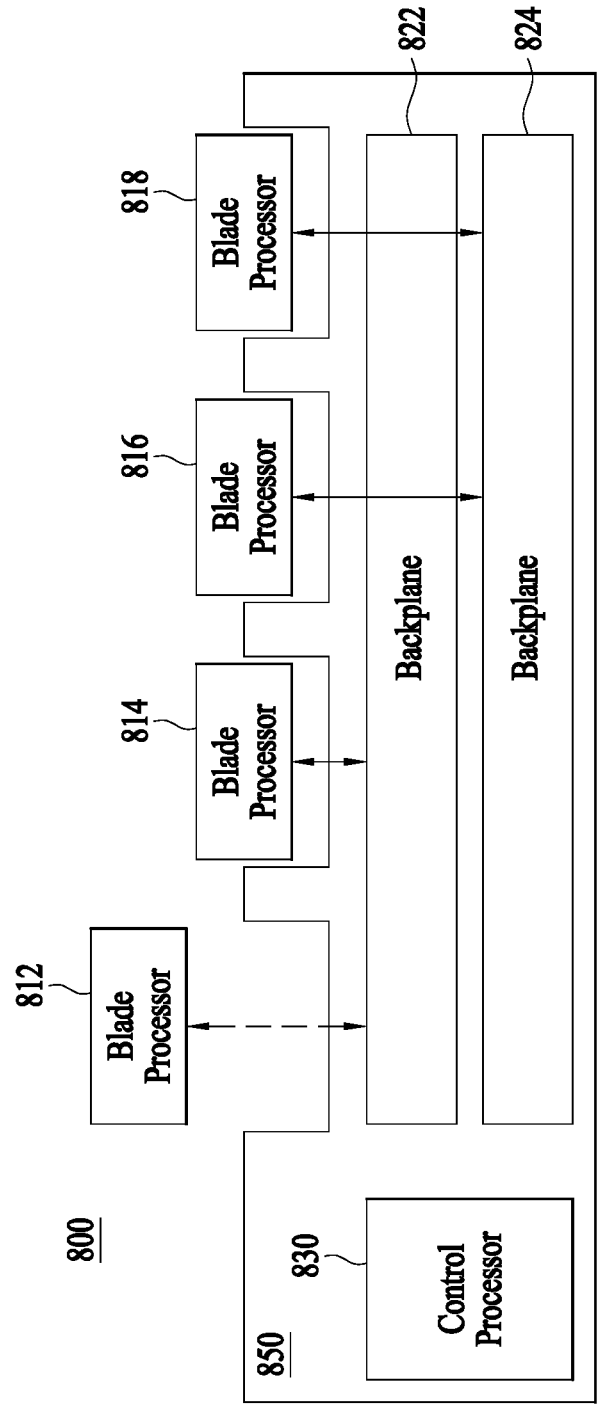
FIG. 8 illustrates a fourth embodiment of the electronic control system.

FIG. 8 illustrates a fourth embodiment of the electronic control system.

An electronic control system 800 may include a first to fourth blade processors 812, 814, 816, and 818, and a backplane assembly 850. The backplane assembly 850 may include a first backplane 822, a second backplane 824, and a control processor 830. The first to fourth blade processors 812, 814, 816, and 818, and the backplane assembly 850 may correspond to the first to fourth blade processors 712, 714, 716, and 718, and the backplane assembly 750 in FIG. 7, and descriptions thereof will not be repeated.

Each of the first to fourth blade processors 812, 814, 816, and 818 is attachable to or detachable from the backplane assembly 850. In addition, the blade processor mounted on the backplane assembly 850 may be replaced with another blade processor.

The control processor 830 may perform verification for a blade processor and perform control such that the verified blade processor is connected to a backplane as a result of performing the verification. Specifically, when the first blade processor 812 is mounted on the backplane assembly 850, the control processor 830 may perform verification for the first blade processor 812. In other words, the control processor 830 may determine whether or not the first blade processor 812 is a trusted processor. The control processor 830 may perform a verification procedure by checking a unique identifier of the first blade processor 812. For example, the unique identifier may be a password or an encrypted key.

The control processor 830 may perform the verification procedure for the first blade processor 812 and perform control such that the first blade processor 812 is connected to the first backplane 822, in a case where the first blade processor 812 is the trusted processor. In addition, the control processor 830 may perform control such that the first blade processor 812 is connected to the communication network established on the first backplane 822.

When the first blade processor 812 is mounted on the backplane assembly 850, a blade processor, which may share a communication network with the first blade processor 812, may perform a verification procedure for the first blade processor 812, and the blade processor may share a communication network with the first blade processor 812, in a case where the first blade processor 812 is the trusted processor.

Figure 9:
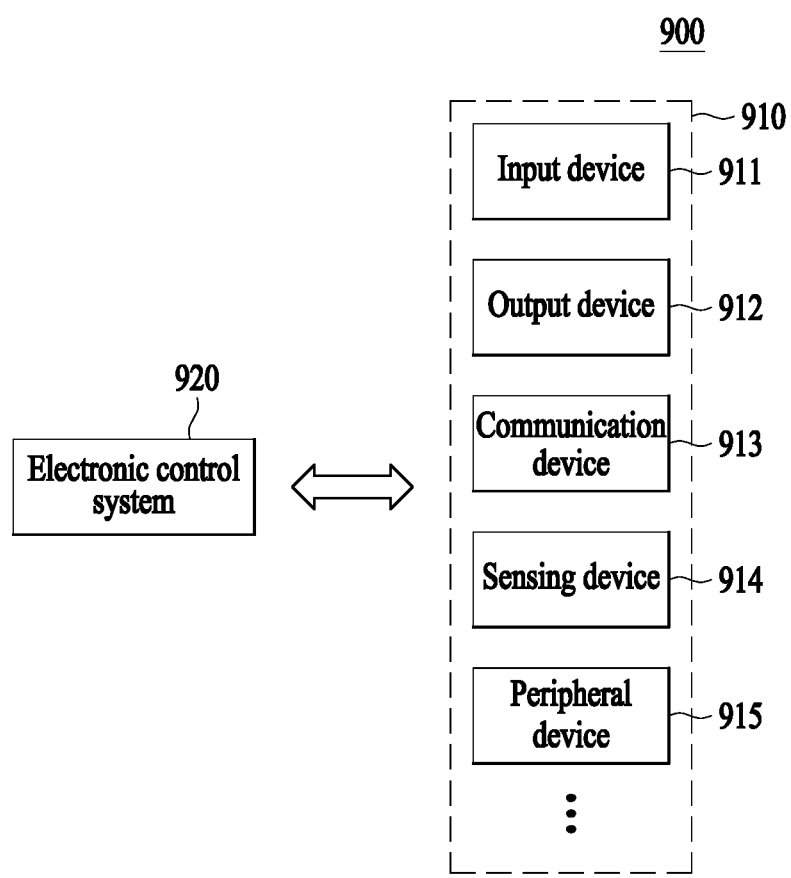
FIG. 9 illustrates a vehicle according to the present disclosure.

FIG. 9 illustrates a vehicle according to the present disclosure.

A vehicle 900 may include electronic devices 910, and an electronic control system 920 for controlling electronic devices 910. The vehicle 900 illustrated in FIG. 9 illustrates only the components related to the present embodiment. Therefore, it will be understood by those skilled in the art that other general-purpose components other than the components illustrated in FIG. 9 may be further included.

The vehicle 900 may be an autonomous driving vehicle.

The electronic devices 910 may include an input device 911, an output device 912, a communication device 913, a sensing device 914 and a peripheral device 915, and further may include other electronic which may be embedded in the vehicle besides those.

The input device 911 refers to means of inputting data for controlling the vehicle 900. For example, the input device 911 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, and the like. In addition, the input device 911 may include a microphone, and the microphone may be configured to receive audio (for example, a voice command) from the passenger of the vehicle 900.

The output device 912 may output an audio signal or a video signal, and the output device 912 may include a display unit and a sound output unit. The input device 911 and the output device 912 may include a network interface and may be implemented as a touch screen.

The communication device 913 may include at least one antenna to wirelessly communicate with other devices. For example, the communication device 913 may be used to communicate with a cellular network or other wireless protocols and systems wirelessly through Wi-Fi or Bluetooth.

The sensing device 914 may include a plurality of sensors configured to sense information of the environment in which the vehicle 900 is located and may also include one or more actuators configured to modify the position and/or orientation of the sensors. For example, the sensing device 914 may include, but is not limited to, a Global Positioning System (GPS), an Inertial Measuring unit (IMU), a RADAR unit, a LIDAR unit, and a camera.

The peripheral device 915 may include, but is not limited to, a navigation system, a light, a turn signal light, a wiper, an internal light, a heater, and an air conditioner.

An electronic control system 920 may include a plurality of blade processors configured to implement different functions through electronic devices 910, and a plurality of backplanes that house a plurality of blade processors for electrical connection between the plurality of blade processors. The first backplane among the plurality of backplanes may separately house at least one blade processor configured to implement a wireless communication function among the plurality of blade processors. The electronic control system 920 may correspond to the electronic control systems 400 to 800 illustrated in FIGS. 4 to 8, and descriptions thereof will not be repeated.

The device described above may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer readable recording medium include magnetic storage media (e.g., ROM, RAM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present embodiment may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An electronic control system for a vehicle, comprising:
a plurality of blade processors configured to implement different functions in the vehicle; and
a plurality of backplanes that house the plurality of blade processors for electrical connection between the plurality of blade processors,
wherein a first backplane among the plurality of backplanes separately houses at least one blade processor configured to implement a wireless communication function, among the plurality of blade processors.

2. The electronic control system according to claim 1, further comprising: a filter configured to remove noise generated from the at least one blade processor,
wherein the first backplane is connected to a second backplane among the plurality of backplanes, through the filter.

3. The electronic control system according to claim 1, further comprising: a control processor,
wherein the control processor receives data to be processed on the at least one blade processor and transmits the received data to a blade processor connected to a second backplane, among the plurality of backplanes.

4. The electronic control system according to claim 1, further comprising: a control processor,
wherein the control processor performs verification for each of the plurality of blade processors and performs control such that a trusted blade processor is connected to a backplane according to a result of performing the verification.

5. The electronic control system according to claim 1, wherein a plurality of communication networks are configured to be established on each of the plurality of backplanes, and
the plurality of blade processors transmit or receive data through a plurality of communication networks.

6. The electronic control system of claim 5, further comprising: a control processor,
wherein the control processor recognizes a first communication network to transmit or receive data among the plurality of communication networks, based on at least one of a state of communication networks and a state of data, and performs control such that data are transmitted or received through the recognized first communication network.

7. The electronic control system according to claim 1, wherein the at least one blade processor includes at least one of a blade processor configured to receive broadcast or radio signals, a blade processor having an RF module, a blade processor having a 5G communication module, a blade processor configured to implement a Vehicle to Everything (V2X) communication function, and a blade processor configured to implement a Dedicated Short Range Communication (DSRC) communication function.

8. A backplane assembly for housing a plurality of blade processors, comprising:
a first backplane that separately houses at least one blade processor configured to implement a wireless communication function, among the plurality of blade processors; and
a second backplane that houses a blade processor other than the at least one blade processor among the plurality of blade processors,
wherein the backplane assembly and the plurality of blade processors are included in an electronic control system for a vehicle,
wherein the plurality of blade processors are configured to implement different functions in the vehicle, and
wherein the backplane assembly houses the plurality of blade processors for electrical connection between the plurality of blade processors.

9. The backplane assembly of claim 8, further comprising:
a filter configured to remove noise generated from the at least one blade processor,
wherein the first backplane is connected to the second backplane, through the filter.

10. The backplane assembly of claim 8, further comprising: a control processor,
wherein the control processor receives data to be processed on the at least one blade processor, and transmits the received data to the blade processor connected to the second backplane.

11. The backplane assembly of claim 8, further comprising: a control processor,
wherein the control processor performs verification for each of the plurality of blade processors, and performs control such that a trusted blade processor is connected to a backplane, according to a result of performing the verification.

12. The backplane assembly of claim 8, wherein a plurality of communication networks are configured to be established on each of a plurality of backplanes, and
the plurality of blade processors transmit or receive data through a plurality of communication networks.

13. The backplane assembly of claim 12, further comprising: a control processor,
wherein the control processor recognizes a first communication network to transmit or receive data among the plurality of communication networks, based on at least one of a state of communication networks and a state of data, and performs control such that data are transmitted or received through the recognized first communication network.

14. The backplane assembly of claim 8, wherein the at least one blade processor includes at least one of a blade processor configured to receive broadcast or radio signals, a blade processor having an RF module, a blade processor having a 5G communication module, a blade processor configured to implement a Vehicle to Everything (V2X) communication function, and a blade processor configured to implement a Dedicated Short Range Communication (DSRC) communication function.

15. A vehicle, comprising:
electronic devices; and
an electronic control system configured to perform control of the electronic devices,
wherein the electronic control system includes a plurality of blade processors configured to implement different functions through the electronic devices; and a plurality of backplanes that house the plurality of blade processors for electrical connection between the plurality of blade processors, and
wherein a first backplane among the plurality of backplanes separately houses at least one blade processor configured to implement a wireless communication function, among the plurality of blade processors.

* * * * *